United States Patent
Schmidt

(10) Patent No.: US 8,399,768 B2
(45) Date of Patent: *Mar. 19, 2013

(54) FLEXIBLE FLAME RETARDANT INSULATED WIRES FOR USE IN ELECTRONIC EQUIPMENT

(75) Inventor: Angelika Schmidt, Selfkant (DE)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,635

(22) Filed: Aug. 5, 2011

(65) Prior Publication Data

US 2012/0018189 A1    Jan. 26, 2012

Related U.S. Application Data

(63) Continuation of application No. 12/682,287, filed as application No. PCT/EP2008/063685 on Oct. 10, 2008, now Pat. No. 8,076,581.

(30) Foreign Application Priority Data

Oct. 11, 2007  (EP) .................................... 07019893

(51) Int. Cl.
 *H01B 7/04*    (2006.01)
(52) U.S. Cl. ............ 174/110 SR; 174/110 SY; 524/126; 524/133
(58) Field of Classification Search ............ 174/110 SR, 174/110 SY; 524/126, 133
See application file for complete search history.

(56) References Cited

U.S. PATENT DOCUMENTS

| | | | |
|---|---|---|---|
| 7,622,522 | B2 | 11/2009 | Qiu et al. |
| 7,847,032 | B2 | 12/2010 | Guo et al. |
| 2006/0278425 | A1 | 12/2006 | Harada et al. |
| 2008/0167406 | A1 | 7/2008 | Yamada |
| 2008/0167408 | A1 | 7/2008 | Siddhamalli et al. |
| 2009/0048373 | A1 | 2/2009 | Clauss et al. |
| 2009/0084577 | A1 | 4/2009 | Qiu et al. |
| 2009/0176091 | A1 | 7/2009 | Karayianni et al. |

FOREIGN PATENT DOCUMENTS

| | | |
|---|---|---|
| EP | 1 624 015 | 2/2006 |
| EP | 1 883 081 | 1/2008 |
| JP | 2007-197489 | 8/2007 |
| WO | 2005/118698 | 12/2005 |

OTHER PUBLICATIONS

International Search Report for PCt/EP2008/063685, mailed Dec. 23, 2008.

*Primary Examiner* — Peter Szekely
(74) *Attorney, Agent, or Firm* — Nixon & Vanderhye P.C.

(57) ABSTRACT

The invention relates to an insulated wire for use in electronic equipment, comprising an electrically conductive core and an insulating layer and/or an insulating jacket consisting of a flame retardant elastomeric composition surrounding the electrically conductive core, wherein the flame retardant elastomeric composition comprises a elastomeric polymer selected from the group consisting of styrenic block copolymers, olefinic thermoplastic elastomers and combinations thereof; and a metal salt of a phosphinic acid of the formula $[R^1R^2P(O)O]^-_m M^{m+}$ (formula I) and/or a diphosphinic acid of the formula $[O(O)PR^1—R^3—PR^2(O)O]^{2-}_n M_x^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups, $R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Ce, Bi, Sr, Mn, Li, Na, and K, and m, n and x are equal or different integers in the range of 1-4.

9 Claims, No Drawings

FLEXIBLE FLAME RETARDANT INSULATED WIRES FOR USE IN ELECTRONIC EQUIPMENT

This application is a continuation of commonly owned U.S. application Ser. No. 12/682,287, filed Apr. 9, 2010 now U.S. Pat. No. 8,076,581, which in turn is the national phase application under 35 USC §371 of PCT/EP2008/063685, filed Oct. 10, 2008, which designated the U.S. and claims priority to EP 07019893.2, filed Oct. 11, 2007, the entire contents of each of which are hereby incorporated by reference.

The present invention relates to a composition for use in insulated wires for use in electronic equipment, comprising an electrically conductive core and an insulating layer surrounding the electrically conductive core.

More particularly, the present invention relates to insulated wires for electronic equipment having excellent consumer appeal (flexible, light, soft and smooth), mechanical and electrical characteristics, humidity, heat and UV resistance and flame retardancy.

Insulated wires, cables and cords, which are used for inner and outer wiring of electric/electronic equipment and the like, are required to have various characteristics, including flame retardancy, heat resistance, electrical and mechanical characteristics (e.g. tensile properties and abrasion resistance). The standards, for example, of the flame retardancy, the heat resistance, and the mechanical characteristics (e.g. tensile properties and abrasion resistance) required for wiring materials of electric/electronic equipment are stipulated in UL. JIS, etc. In particular, with respect to the flame retardancy, its test method varies depending on the required level (its use to be applied) and the like. Therefore, practically, it is enough for the material to have at least the flame retardancy according to the required level. For example, mention can be made the respective flame-retardancy to pass the vertical flame test (VW-1) stipulated in UL 1581 (Reference Standard for Electrical wires, Cables, and Flexible Cords), or the horizontal test and the inclined test stipulated in JIS C3005 (rubber/plastic insulated wire test method. Further, wiring materials used in electric/electronic equipment are sometimes required to have a heat resistance of 80 to 105' C., or even 125° C., while in continuous use.

Conventionally, as the covering material used for these wiring materials, polyvinyl chloride (PVC) compounds comprising plasticizer, heavy metal stabilizer, and halogen atoms containing flame retardants were used. These materials however posed environmental problems in that, when the wires are discarded or buried without being treated properly, the plasticizer and/or the heavy metal stabilizer is oozed out, or when they are burned, harmful gases are produced from the halogen.

As the PVC compounds became controversial, halogen free compounds comprising polyolefin copolymers and a halogen free flame retardant system comprising metal hydrate and optionally red phosphorous, were used as the wiring insulating material. Red phosphorous was used to enable reduction of the metal hydrate, since the metal hydrate, when used alone, had to be added in such high amounts that mechanical properties were jeopardized. However, flame retardant materials containing phosphorus pose other problems in that when the material is burned the phosphorus can produce toxic fumes whereas when the material is discarded the phosphorus can pollute the water environment by eutrophication. Furthermore, where wires and cables have to be coded with colour codes, red phosphorus cannot be used.

To comply with the heat resistance requirements, the covering material is crosslinked by an electron beam crosslinking method or a chemical crosslinking method, in order to render the wiring material highly heat resistant or an isolating material comprising a high melting point, such as a high melting polypropylene is used. Crosslinking however prevents melting of the insulating material and thus limits recyclability whereas the measures for crosslinking, either chemically by use of special additives or with special equipment, such as an electron beam crosslinking equipment, increases the cost of the electrical wire. On the other hand, where a high proportion of resin such as a polypropylene, is used the flexibility is poor, and when the wiring material covered with such a resin is bent, a phenomenon occurs that whitens the surface.

A thermoplastic polymer composition for the purposes of the present invention means a polymer composition which is or has the ability to be repeatably heat processable, such that the material is considered to be recyclable in the same or other applications. Thus, the mechanical properties of a thermoplastic plastic composition which has been processed once or several times into the insulating covering of a wire or the like are comparable with the properties of the starting material.

A thermosetting composition for the purposes of the present invention means a polymer composition which is or has the ability to be crosslinked to the extent that is no longer repeatably heat processable, such that the material is not considered recyclable. Typically this is achieved through electron beam crosslinking method or a chemical crosslinking method.

A covering material of an electrical wire used for consumer electronic appliances is also required to satisfy dynamic properties stipulated, e.g., under UL Standard, more specifically, required to have an elongation of at least 100% and a tensile strength of at least 8 MPa for an outer insulated jacket and at least 5 MPa for an inner insulating layer. In particular, a covering material of electrical or data cables is required to further have a good flexibility because these cables are shipped in the bundled state.

In certain applications, the insulated wires are also required to have good electrical properties, such as arc tracking resistance (class 1 (>400V) or class 0 (>600V)) as measured through the comparative tracking index (CTI). This property is especially important when the insulated wire is operated within an electrical field.

In addition to these flame retardant, electrical and mechanical functional properties, there is increasing demand for insulated wires which have consumer appeal. The increasing popularity of electronic equipment such as computers, music and multi-media devices has lead to heavy competition and, as such, a need for manufacturer's to differentiate their product in the market. Embodiments of insulated wires include headphone wiring, power cables and a myriad of cabling which interconnect various components of multi-media technology (eg. USB cables). While wireless technology has been developed in an attempt to free the consumer from an entanglement of wires, there will still be a need for insulated wires. In these instances, insulated wires with increased consumer appeal will be sought after. Insulated wires which are light (low density), soft, easily bendable, glossy and/or smooth are thought to be attributes which induce consumer appeal. The abovementioned mechanical attributes solve the problem of wires which get tangled; caught up on foreign objects; create excessive friction when passing over surfaces; causing skin irritation and/or consumer discomfort when constantly contacted; and so on. The solving of these problems creates consumer appeal. The functional demands placed upon insulated wires to conform to flame retardant, mechanical and electrical properties make the further limitation of "consumer appeal" a challenging task.

Improvements in the halogen free flame retardant compositions for moulded articles including electrical and electronic components are disclosed in WO 2005/118698 which provides a solution that includes a polyamide, an aromatic polymer and a flame retardant system comprising a metal phosphinate or diphosphinate salt; and at least one nitrogen compound derivable from the condensation products of melamine and/or reaction products of condensation products of phosphoric acid. The document discloses that additional layers of coatings may be applied to the substrate to impart additional properties, such as scratch resistance and aesthetic appeal. The resulting composition was shown to have improved electrical and flammability properties.

The problems associated with increasing the consumer appeal of insulated wires, while maintaining sufficient mechanical, electrical and flame retardant properties, has been addressed, in part, by the use of flame retardants in combination with thermoplastic elastomers which exhibit the properties of softness, flexibility and resilience. However there is need for further improvements in flame retardant insulated wires, particularly those directed towards the consumer market.

The aim of the invention is to provide insulated wires for use in electronic equipment comprising an electrically conductive core and an insulating layer surrounding the electrically conductive core consisting of a halogen free flame retardant elastomeric composition, which provide a good balance between flame retardancy, mechanical and electrical properties. Moreover, the insulated wires must also have good consumer appeal, as provided by a combination of good softness, surface smoothness, low density and/or flexibility.

In one embodiment of the present invention there is provided an insulated wire for use in electronic equipment, comprising an electrically conductive core and an insulating layer and/or an insulating jacket consisting of a flame retardant elastomeric composition surrounding the electrically conductive core, wherein the flame retardant elastomeric composition comprises (A) an elastomer selected from the group consisting of styrenic block copolymers, olefinic thermoplastic elastomers and combinations thereof; and (B) a metal salt of a phosphinic acid of the formula $[R^1R^2P(O)O]^-_m M^{m+}$ (formula I) and/or a diphosphinic acid of the formula $[O(O)PR^1—R^3—PR^2(O)O]^{2-}_n M_x^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups, $R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Co, Bi, Sr, Mn, Li, Na, and K, and m, n and x are equal or different integers in the range of 1-4.

Preferably, the level of component A is more than 10 wt %, 12 wt % 15 wt %, 18 wt %, 20 wt %, 25 wt %, 30 wt % or 50 wt % relative to the total weight of the flame retardant elastomeric composition. The higher the proportion of component A, the greater the consumer appeal properties as measured by softness and flexibility. While, the thermoplastic polymers may essentially consist of component A, typically components C and/or D (defined below) are added to enhance mechanical, electrical and/or consumer appeal properties depending on the specific end use of the insulated wire. Component A represents no more than 90 wt %, preferably no more than 80 wt % or 70 wt % relative to the total weight of the polymer component in the flame retardant elastomeric composition.

In general, too high a level of component A results in a decreased flame retardancy and a deterioration in some mechanical properties. However, in a special embodiment of the present invention, when component A consists of one or more olefinic thermoplastic elastomers, then component A may be greater than 90 wt. % and even 100 wt. % relative to the total weight of the polymer component in the flame retardant elastomeric composition.

It has been unexpectedly found that the consumer appeal of flame retardant insulated wires may be enhanced through the composition of the present invention, while maintaining the required flame retardant, electrical and/or mechanical properties. The effect of the insulating layer and/or jacket in the insulated wire according to the present invention consisting of the said flame retardant elastomeric composition is that the insulated wire has flame retardancy properties compliant with UL94-V2, UL94-V1, UL94-V0 (at a distance of 1.5 to 3 mm) or UL 1581 VW-1 and exhibits mechanical properties which are both functional and attractive to the consumer, such as softness, high flexibility, low heat deformation and/or smooth surface properties. The flame retardant elastomeric composition preferably further comprises:

(C) a thermoplastic polymer selected from the group consisting of a copolyester elastomer (TPE-E), a copolyamide elastomer (TPE-A), a copolyurethane elastomer (TPE-U), and combinations thereof.

The thermoplastic polymer is advantageously included in the composition to impart improved mechanical and thermal stability properties. In this aspect of the present invention, the compositions possess good heat deformation properties that allow the compositions to be exposed to elevated temperatures without excessive permanent deformation. This property is particularly important as it enables the cables to maintain their shape and flexibility while being exposed to elevated temperatures encountered in everyday situations, such as contact with hot beverages or electrical appliances. The electrical risk associated with a reduced insulating layer due to poor heat deformation properties is also reduced.

In applications in which high temperature stability is less critical, the addition of a copolyurethane elastomer and/or a polypropylene (component D) may provide a cost effective balance between cost and functionality. Where high temperature performance and flame retardancy is more critical, a copolyester elastomer and/or a copolyamide elastomer may be advantageously added. In a preferred embodiment, the thermoplastic polymer comprises a copolyester elastomer, such as a copolyetherester.

The flame retardant elastomeric composition preferably further comprises:

(D) an olefin polymer,

The addition of the olefin polymer to the styrenic copolymer provides the synergistic effect of improving processability, especially at higher styrenic copolymer levels (eg. above 50% wt relative to the total weight of the flame retardant elastomeric composition), and enhancing consumer appeal of the insulated wire, and reducing polymer costs. For example, the addition of linear low density polyethylene (LLDPE) and/or ethylene or polypropylene based copolymers results in a smooth and glossy surface. For this reason, compositions including an olefin polymer are especially preferred in embodiments in which the composition forms the outer layer of the insulated wire.

In certain embodiments, the flame retardant elastomeric composition further comprises:
(E) a flame retardant component consisting of a nitrogen containing flame retardant synergist and/or a phosphor/nitrogen containing flame retardant and/or
(F) an inorganic compound chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof.

Components (E) and (F) provide additional flame retardant properties and may be advantageously combined with component (B) to provide a cost effective flame retardant system.

The flame retardant elastomeric composition consisting essentially of the combination of the polymer component A with flame retardant components (B) and (E) is able to satisfy the flame retardant requirements of the UL 1581 VW-1 standard. However, the addition of other thermoplastic polymer components (C) and (D) may advantageously further enhance the electrical, mechanical and/or consumer appeal properties. Surprisingly, the addition of other polymer components synergistically reduces the total level of components (B) and (E) required to satisfy the flame retardant requirements of the UL 1581 VW-1 standard.

Flame retardant properties compliant with the UL 1581 VW-1 standard are obtainable when the flame retardant components (B) and (E) are present in a relative low amount, i.e. at levels far below the minimum level needed for obtaining, for example, a UL-V-0 rating. This result is highly surprising in particular in view of the fact that in flame retardant compositions comprising a TPE-E (which has at least as good flame retardant properties as a styrenic block copolymer, such as SEBS) and further comprising other halogen free flame retardants, for example melamine cyanurate, the level of flame retardant can be adjusted to comply with a UL-V-0 rating, but which level is still not sufficient to comply with the UL 1581 VW-1 standard. The minimum level of melamine cyanurate to comply with UL-V-0, while still failing UL 1581 VW-1, is much higher than the level of the flame retardant system used in the flame retardant elastomeric composition in the insulated wire according to the invention needed to already comply with the UL 1581 VW-1 standard.

The specific flame retardant elastomeric composition may be adjusted to be suitable for use as insulting layer or jacket in electrical cables which are required to have flame retarding properties complying with UL-V-2. UL-V-1 or UL-V-0 or UL 1581 VW-1.

In preferred embodiments of the invention, the insulated wires also have a class 0 or class 1 rating under the CTI.

The relative lower levels of flame retardants, as defined in the present invention, required to achieve the flame retardant objectives of a specific insulated wire end-use applications combined with the advantageous properties of the styrenic block copolymer or olefinic thermoplastic elastomers, enable a good balance of electrical, mechanical and consumer appeal goals to be more readily obtained.

For instance, a relatively lower flame retardant level enables a flame retardant elastomeric composition to be produced which has a very high degree of flexibility, exhibited by a low E-modulus or yield stress. This low E-modulus or yield stress may be attributable to the styrenic block copolymer or the olefinic thermoplastic elastomer and, when present, the TPE-E, TPE-U TPE-A, and/or olefin polymer, such as PP or LLDPE in the flame retardant elastomeric composition. The degree of flexibility is surprising given the presence and performance of the flame retardant system.

This in contrast to other flame retardant systems, such as melamine cyanurate, which when used in a same amount as the flame retardant system in the insulated wire according to the invention, detracts much more from the original flexural modulus of the styrenic block copolymer or olefinic thermoplastic elastomer. This negative effect would have been further augmented to a detrimental level when the amount of melamine cyanurate would have to be raised to such a level where the composition would comply with at least UL94-V2, let alone UL 1581 VW-1 if possible anyway.

Polymer Components (A), (C) and (D)
Styrenic Block Copolymers and/or an Olefinic Thermoplastic Elastomers (TPO) (A)
Styrenic Block Copolymers The styrenic block copolymer (A) comprised by the flame retardant elastomeric composition in the insulated wire according to the invention include diblock or triblock polymers or combinations thereof. Styrenic block copolymers have good surface quality, high dimensional stability and constant mechanical properties almost up to the softening temperature.

In a preferred embodiment, the styrenic block copolymer, relative to the total weight of the polymer component in the flame retardant elastomeric composition, is in the range of 15 to 40 wt % and more preferably in the range of 20 to 30 wt. %.

Preferred styrenic block copolymers include an acrylonitrile-styrene copolymer (AS), an acrylonitrile-butadiene-styrene copolymer (ABS), a styrene-butadiene-styrene (SBS) copolymer, a styrene-isoprene-styrene (SIS) copolymer, a styrene-ethylene-butylene-styrene (SEBS) copolymer, a styrene-acrylonitrile-ethylene-propylene-ethylidene norbornene copolymer (AES), and a hydrogenerated product thereof. Hydrogenated block copolymers include an ethylene/butylene in the midblock (S-(EB/S)-S) and polystyrene-b-poly(ethylene/propylene), polystyrene-b-poly(ethylene/propylene)-b-polystyrene, polystyrene-b-poly(ethylene/butylene)-b-polystyrene and polystyrene-b-poly(ethylene-ethylene/propylene)-b-polystyrene.

Preferably, the styrenic block copolymer is a hydrogenated styrenic block copolymer as this class of compound exhibits excellent UV resistant properties.

Particularly preferred styrenic block copolymers includes, a styrene-ethylene-butylene-styrene (SEBS) copolymer or a styrene-ethylene/propylene-styrene (SEPS). The styrenic block copolymers may be used alone or in combination.

The styrenic block copolymers are preferably grafted with maleic anhydride (MA) or the like onto the copolymer midblock. Typically, between 0.5 to 5.0 wt. % MA, more preferably, 1.0 to 2.5 wt % relative to the total weight of the styrenic block copolymer is grafted onto the block copolymer. The MA grafting improves the adhesion of the copolymer to a variety of substrates including polyamides and polyester.

The styrenic block copolymers preferably have a styrene content, relative to the total weight of the styrenic block copolymer, of at least 10 wt. %, more preferably at least 20 wt. %, more preferably at least 30 wt. %, even more preferably at least 35 wt. % and most preferably at least 40 wt. %. It has been found that the higher the styrenic content the less flame retardant components (B), (E) and (F) is required to achieve the same level for flame retardancy. The styrene content, relative to the total weight of the styrenic block copolymer, is preferably no more than 70 wt. % and more preferably no more than 60 wt. %. Too high a styrene content tends to result in stiffer compositions which are not suitable for cable and wire applications.

The styrene content is determined according to the method outlined in ISO 5478:2006.

Preferable the styrenic block copolymer has a MFI of at least 10 g/10 min (230° C./2.16 kg), and more preferably 10 g/10 min (230° C./2.16 kg). A higher MFI contributes to a smoother surface of the resultant cables.

Olefinic Thermoplastic Elastomers (TPO)

Olefinic thermoplastic elastomers, within the scope of the present invention, includes thermoplastic olefins (uncrosslinked thermoplastic elastomers) and thermoplastic vulcanizates (crossed linked thermoplastic elastomers). TPOs impart rubber-like properties, such as softness and flexibility, which translate into an increase consumer appeal in the resultant insulated wires. TPOs may also provide cost benefits in applications in which heat resistance, flame retardancy requirements are low.

TPOs are polyolefinic matrices, preferably crystalline, through which thermoplastic or thermoset elastomers are generally uniformly distributed. Examples of TPOs include EPM and EPDM thermoset materials distributed in a crystalline polypropylene matrix. Any conventional TPO having the desired softness, flexibility and strength may be used in the present invention. Although not intended to be limiting, examples of suitable TPOs for use in the present invention include those prepared by blending an olefinic thermoplastic and either an ethylene copolymer or terpolymer, such as disclosed in U.S. Pat. No. 4,990,566 to Hert, or a nitrile rubber, such as disclosed in U.S. Pat. No. 4,591,615 to Aldred et al, the disclosure of both of which are incorporated herein by reference.

Commercial TPOs, also called TPV, are typically based on vulcanized rubbers in which a phenolic resin, sulfur or peroxide cure system is used to vulcanize, that is crosslink, a diene (or more generally, a polyene) copolymer rubber by way of dynamic vulcanization, which is a process in which the rubber is crosslinked while mixing (typically vigorously), in a thermoplastic matrix therefore enabling further thermal processing and/or recycleability of the material. Although any cure system is contemplated by the present embodiments, sulfur is typically preferred over peroxide free radical or a phenolic resin cure systems because peroxide may degrade and/or crosslink the polypropylene or polyethylene thermoplastic as well as the rubber. This is in turn limits the extent of rubber crosslinking that can occur before the entire mixture degrades or crosslinks and is no longer thermoplastic, while phenolic cure systems may cause a yellowish tint to the final product.

Two examples of preferred commercial TPOs are SANTOPRENE® thermoplastic rubber, which is manufactured by Advanced Elastomer Systems and SARLINK®, available from DSM Elastomers, both of which are a mixture of crosslinked EPDM particles in a crystalline polypropylene matrix.

A typical TPO is a melt blend or reactor blend of a polyolefin plastic, typically a propylene polymer, with a crosslinked olefin copolymer elastomer (OCE), typically an ethylene-propylene rubber (EPM) or an ethylene-propylene-diene rubber (EPDM). In those TPO's made from EPDM, the diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

Thermoplastic Polymer (C)

The thermoplastic polymer (C) comprised by the flame retardant elastomeric composition in the insulated wire according to the invention, is selected from the group consisting of a copolyester elastomer TPE-E, a copolyamide elastomer TPE-A and/or a copolyurethane elastomer. This group of thermoplastics have good mechanical and thermal properties which enhances the performance of the flame retardant elastomeric composition.

TPE-E/TPE-A

Copolyester elastomers and copolyamide elastomers are thermoplastic polymers with elastomeric properties comprising hard blocks consisting of respectively polyester segments or polyamide segments, and soft blocks consisting of segments of another polymer. Such polymers are also known as block-copolymers. The polyester segments in the hard blocks of the copolyester elastomers are generally composed of repeating units derived from at least one alkylene diol and at least one aromatic or cycloaliphatic dicarboxylic acid. The polyamide segments in the hard blocks of the copolyamide elastomers are generally composed of repeating from at least one aromatic and/or aliphatic diamine and at least one aromatic or aliphatic dicarboxylic acid, and or an aliphatic amino-carboxylic acid.

The hard blocks typically consist of a polyester or polyamide having a melting temperature or glass temperature, where applicable, well above room temperature, and may be as high as 300° C. or even higher. Preferably the melting temperature or glass temperature is at least 150° C., more preferably at least 170° C. or even at least 190° C. Still more preferably the melting temperature or glass temperature of the hard blocks is in the range of 200-280° C., or even 220-250° C. The soft blocks typically consist of segments of an amorphous polymer having a glass transition temperature well below room temperature and which temperature may be as low as −70° C. or even lower. Preferably the glass temperature of the amorphous polymer is at most 0° C., more preferably at most −10° C. or even at most −20° C. Still more preferably the glass temperature of the soft blocks is in the range of −20--60° C., or even −30--50° C.

Suitably, the copolyester elastomer is a copolyesterester, elastomer, a copolycarbonateester, elastomer, and/or a copolyetherester elastomer; i.e. a copolyester block copolymer with soft blocks consisting of segments of polyesters, polycarbonate or, respectively, polyether. Suitable copolyesterester elastomers are described, for example, in EP-0102115-B1. Suitable copolycarbonateester elastomers are described, for example, in EP-0846712-B1. Copolyester elastomers are available, for example, under the trade name Arnitel, from DSM Engineering Plastics B.V. The Netherlands. Suitably, the copolyamide elastomer is a copolyetheramide elastomer. Copolyetheramide elastomers are available, for example, under the trade name PEBAX, from Elf Atochem, France.

Preferably, the block-copolymer elastomer in the flame retardant elastomeric composition is a copolyester, elastomer, more preferably a copolyetherester elastomer.

Copolyetherester elastomers have soft segments derived from at least one polyalkylene oxide glycol. Copolyetherester elastomers and the preparation and properties thereof are in the art and for example described in detail in Thermoplastic Elastomers, 2nd Ed., Chapter 8, Carl Hanser Verlag (1996) ISBN 1-56990-205-4, Handbook of Thermoplastics, Ed. O. Otabisi, Chapter 17, Marcel Dekker Inc., New York 1997, ISBN 0-8247-9797-3, and the Encyclopedia of Polymer Science and Engineering. Vol. 12, pp. 75-117 (1988), John Wiley and Sons, and the references mentioned therein.

The aromatic dicarboxylic acid in the hard blocks of the polyetherester elastomer suitably is selected from the group consisting of terephthalic acid, isophthalic acid, phthalic acid, 2,6-naphthalenedicarboxylic acid and 4,4-diphenyldicarboxylic acid, and mixtures thereof. Preferably, the aromatic dicarboxylic acid comprises terephthalic acid, more preferably consists for at least 50 mole %, still more preferably at least 90 mole %, or even fully consists of terephthalic acid, relative to the total molar amount of dicarboxylic acid.

The alkylene diol in the hard blocks of the polyetherester elastomer suitably is selected from the group consisting of ethylene glycol, propylene glycol, butylene glycol, 1,2-hexane diol, 1,6-hexamethylene diol, 1,4-butane diol, benzene dimethanol, cyclohexane diol, cyclohexane dimethanol, and mixtures thereof. Preferably, the alkylene diol comprises ethylene glycol and/or 1,4 butane diol, more preferably consists for at least 50 mole %, still more preferably at least 90 mole %, or even fully consists of ethylene glycol and/or 1,4 butane diol, relative to the total molar amount of alkylene diol.

The hard blocks of the polyetherester elastomer most preferably comprise or even consist of polybutylene terephthalate segments.

Suitably, the polyalkylene oxide glycol is a homopolymer or copolymer on the basis of oxiranes, oxetanes and/or oxolanes. Examples of suitable oxiranes, where upon the polyalkylene oxide glycol may be based, are ethylene oxide and propylene oxide. The corresponding polyalkylene oxide glycol homopolymers are known by the names polyethylene glycol, polyethylene oxide, or polyethylene oxide glycol (also abbreviated as PEG or PEO), and polypropylene glycol, polypropylene oxide or polypropylene oxide glycol (also abbreviated as PPG or PPO), respectively. An example of a suitable oxetane, where upon the polyalkylene oxide glycol may be based, is 1,3-propanediol. The corresponding polyalkylene oxide glycol homopolymer is known by the name of poly(trimethylene)glycol. An example of a suitable oxolane, where upon the polyalkylene oxide glycol may be based, is tetrahydrofuran. The corresponding polyalkylene oxide glycol homopolymer is known by the name of poly(tretramethylene)glycol (PTMG) or polytetrahydrofuran (PTHF). The polyalkylene oxide glycol copolymer can be random copolymers, block copolymers or mixed structures thereof. Suitable copolymers are, for example, ethylene oxide/polypropylene oxide block-copolymers, (or EO/PO block copolymer), in particular ethylene-oxide-terminated polypropylene oxide glycol.

The polyalkylene oxide can also be based on the etherification product of alkylene diols or mixtures of alkylene diols or low molecular weight poly alkylene oxide glycol or mixtures of the aforementioned glycols.

Preferably, the polyalkylene oxide glycol used in the flame retardant elastomeric composition in the insulated wire according to the invention is selected from the group consisting of polypropylene oxide glycol homopolymers (PPG), ethylene oxide/polypropylene oxide block-copolymers (EO/PO block copolymer) and poly(tretramethylene)glycol (PTMG), and mixtures thereof.

TPE-U

The urethane-based thermoplastic elastomer is a resin synthesized by the urethane reaction in which an isocyanate compound is reacted with a compound having active hydrogen, e.g., polyol, optionally in the presence of a chain-extending agent or another additive. It may be produced when the foam is produced or beforehand, or a commercial one.

The isocyanate compounds include aromatic diisocyanates of 6 to 20 carbon atoms (excluding the carbon atom in NCO group), aliphatic diisocyanates of 2 to 18 carbon atoms, alicyclic diisocyanates of 4 to 15 carbon atoms, aromatic aliphatic diisocyanates of 4 to 15 carbon atoms, and modifications thereof (e.g., the modifications containing urethane group, carbodiimide group, allophanate group, urea group, biuret group, urethodione group, urethoimine group, isocyanurate group and oxazolidone group).

More concretely, the isocyanate compounds include tolylene diisocyanate, diphenyl methane diisocyanate, naphthalene diisocyanate, hexamethylene diisocyanate, dicyclomethane diisocyanate, isophorone diisocyanate, xylene diisocyanate, norbornane dimethyl isocyanate and so on.

The compounds having active hydrogen include polyols, polyamine compound, and so on. The concrete examples of polyol compound include ester-based, adipate-based, ether-based, lactone-based and carbonate-based compounds. The chain-extending agents include low-molecular-weight diols, alkylene diamines, or the like.

The ester-based and adipate-based polyol compounds include compounds produced by condensation reaction between a polyhydric alcohol (e.g., ethylene glycol, propylene glycol, butanediol, butenediol, hexanediol, pentanediol, neopentyldiol or pentanediol) and dibasic acid (adipic acid, sebacic acid, azelaic acid, terephthalic acid, isophthalic acid, maleic acid, aromatic carboxylic acid or the like).

The ether-based polyol compounds, for example, include polyethylene glycol, polypropylene ether glycol, polytetramethylene ether glycol, polyhexamethylene ether glycol and so on. The lactone-based polyols include polycaprolactone glycol, polypropiolactone glycol, polyvalerolactone glycol and so on.

The carbonate-based polyols include the compounds obtained by dealcoholization of a polyhydric alcohol (e.g., ethylene glycol, propylene glycol, butanediol, pentanediol, octadiol, nonanediol or the like) with a compound, e.g., diethylene carbonate or dipropylene carbonate.

The commercial urethane-based thermoplastic elastomers include, for example, Pellethane 2103 series (PTMG ether type), 2102 series (caproester type), 2355 series (polyester adipate type) and 2363 series (PTMG ether type) (trade names of Dow Chemical); Resamine P-1000 and P-7000 series (adipate ester type), P-2000 series (ether type), P-4000 series (caprolactone type) and P-800 series (carbonate type) (trade names of Dainichiseika Color and Chemicals); Pandex T series (trade name of DIC Bayer Polymer); Miractone E and P types (trade names of Nippon Miractone); Estolan (trade name of Takeda Burdaysh Urethane); and Morcene (trade name of Morton). They are hereinafter sometimes referred to as thermoplastic polyurethane elastomers (TPU).

The thermoplastic polymer (C) may comprise, next to the copolyester elastomer, copolyurethane elastomer and/or copolyamide elastomer, one or more other thermoplastic polymers. Suitable other thermoplastic polymers are, for example, polyesters, polyamides and polycarbonates. The other thermoplastic polymers are suitably present in such an amount that the flame retardancy properties such as UL-V-2, UL-V-1 or UL-V-0 or UL 1581 VW-1 are maintained and the mechanical properties are retained at a level corresponding with the requirements of the intended application of the insulated wires.

Olefinic Polymers (D)

The olefinic polymers include, for example, a homo-or copolymer of a $C_{2-10}$ olefin such as ethylene and propylene and combinations thereof. Particularly polypropylene, LLDPE and/or ethylene-series resin (e.g., an ethylene-propylene copolymer or ethylene copolymers with propylene, butane, hexane or oxtene as copolymers) are preferred. The term polypropylene includes homopolymers and copolymers. The copolymers preferably contain no more than 10, 5 or 2 wt % non-propylene olefinic monomers, such as α-olefinic monomers. The addition of olefinic polymers contributes towards a smooth surface and glossy appearance thereby increasing consumer appeal. Further, the addition of the olefinic polymer assists in improving processability of the styrenic block copolymer, especially at high styrenic block copolymer levels (eg. greater than 50 wt % relative to the total weight of the polymer component).

Total Polymer Blend

The flame retardant elastomeric composition comprises a total polymer component which consists of components A, C, D and all other polymer components within the flame retardant elastomeric composition.

Preferably, the olefin polymer D is present in the range between 0 wt % to 15 wt % and more preferably in the range 5 wt % relative to 10 wt % to the total weight of the total polymer component in the flame retardant elastomeric composition. However, in some applications, requiring low flame retardancy, levels of up to 20 wt % or 25 wt % may be used.

Preferably, the combined level of components A+D is more than 15 wt %, 20 wt %, 25 wt % or 30 wt % relative to the total weight of the total polymer component in the flame retardant elastomeric composition. The higher the proportion of component A+D, the greater the consumer appeal properties as measured by softness, flexibility, surface smoothness and/or gloss.

Preferably, component C is no more than 85 wt %, 75 wt % or even 65 wt % relative to the total weight of the total polymer component. The minimum level of component C is preferably 10 wt %, 20 wt %, 30 wt % or 40 wt % depending upon mechanical and/or thermal resistant properties required by the insulated wire.

Preferably the thermoplastic polymer components A+C+D are present at a level of least 50 wt. %, more preferably at least 70 wt. %, and still more preferably at least 90 wt. % or 95 wt. %, relative to the total weight of the total polymer component in the flame retardant elastomeric composition. The combination of components A+C+D at these levels provides an elastomeric composition with a good balance between, flame retardant, mechanical, electrical and consumer appeal properties.

Flame Retardant Components (B, E & F)

The component B in the flame retardant elastomeric composition consists of metal salts of phosphinic acids and/or diphosphinic acids or polymeric derivatives thereof, which compounds are also denoted as metal phosphinates. This term will also be used further herein to indicate the same compounds.

Suitably, the metal phosphinate is a metal of a phosphinic acid of the formula $[R^1R^2P(O)O]^-_mM^{m+}$ (formula I) and/or a diphosphinic acid of the formula $[O(O)PR^1—R^3—PR^2(O)O]^{2-}_nM_x^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups.

$R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Ce, Bi, Sr, Mn, Li, Na, and K, and m, n and x are equal or different integers in the range of 1-4.

Suitable metal phosphinates that can be used as component B in the present invention are described for example in DE-A 2 252 258, DE-A 2 447 727, PCT/W-O97/39053 and EP-0932643-B1. Preferred phosphinates are aluminium-, calcium- and zinc-phosphinates, i.e. metal phosphinates wherein the metal M=Al, Ca, Zn respectively, and combinations thereof. Also preferred are metal phosphinates wherein $R^1$ and $R^2$ are the same or different and are equal to H, linear or branched $C_1$-$C_6$-alkyl groups, and/or phenyl. Particular preferably, $R^1$, $R^2$ are the same or different and are chosen from the group consisting of hydrogen (H), methyl, ethyl, n-propyl, iso-propyl, n-butyl, tert.-butyl, n-pentyl and phenyl. More preferably, $R^1$ and $R^2$ are the same or different and are chosen from the group of substituents consisting of H, methyl and ethyl.

Also preferably $R^3$ is chosen from the group consisting of methylene, ethylene, n-propylene, iso-propylene, n-butylene, tert.-butylene, n-pentylene, n-octylene, n-dodecylene, phenylene and naphthylene.

Highly preferably, the metal phosphinate comprises a hypophosphate and/or a $C_1$-$C_2$ dialkylphosphinate, more preferably Ca-hypophosphate and/or an Al—$C_1$-$C_2$ dialkylphosphinate, i.e. Al-dimethylphosphinate, Al-methylethylphosphinate and/or Al-diethylphosphinate.

The nitrogen containing and nitrogen/phosphor containing component (E) in the flame retardant elastomeric copolymer composition can be any nitrogen or nitrogen and phosphor containing compound that itself is a flame retardant and/or is a flame retardant synergist for phosphinate flame retardants. Suitable nitrogen containing and nitrogen/phosphor containing compounds that can be used as component (E) are described, for example in PCT/EP97/01664, DE-A-197 34 437, DE-A-197 37 72, and DE-A-196 14 424.

Preferably, the nitrogen containing synergist is chosen from the group consisting of benzoguanamine, tris(hydroxyethyl)isocyanurate, allantoine, glycouril, melamine, melamine cyanurate, dicyandiamide, guanidine and carbodiimide, and derivatives thereof.

More preferably, the nitrogen containing synergist comprises a condensations product of melamine. Condensations products of melamine are, for example, melem, melam and melon, as well as higher derivatives and mixtures thereof. Condensations products of melamine can be produced by a method as described, for example, in PCT/WO 96/16948.

Preferably, the nitrogen/phosphor containing flame retardant is a reaction product of melamine with phosphoric acid and/or a condensation product thereof. With the reaction product of melamine with phosphoric acid and/or a condensation product thereof are herein understood compounds, which result from the reaction of melamine or a condensation products of melamine are, for example, melem, melam and melon, with a phosphoric acid.

Examples include dimelaminephosphate, dimelamine pyrophosphate, melamine phosphate, melamine polyphosphate, melamine pyrophosphate, melamine polyphosphate, melam polyphosphate, melon polyphosphate and melem polyphosphate, as are described for example in PCT/WO 98/39306. More preferably the nitrogen/phosphor containing flame retardant is melamine polyphosphate.

Also preferably, the nitrogen/phosphor containing flame retardant is a reaction product of ammonia with phosphoric acid or a polyphosphate modification thereof. Suitable examples include ammonium hydrogenphosphate, ammonium dihydrogenphosphate and ammonium polyphosphate. More preferably the nitrogen/phosphor containing flame retardant comprises ammonium polyphosphate.

Preferably the flame retardant component (E) is a phosphate compound, more preferably a melamine phosphate compound, most preferably a melamine polyphosphate.

The flame retardant elastomeric composition in the insulated wire according to the invention preferably comprises an inorganic compound F chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof.

Preferred metal oxides are magnesium oxide, calcium oxide, aluminium oxide, zinc oxide, manganese oxide and stannum oxide.

Preferred hydroxides are aluminium hydroxide, bohmite, magnesium hydroxide, hydrotalcite, dihydrotalcite, hydrocalumite, calcium hydroxide, zinc hydroxide, stannum oxidehydrate and manganese hydroxide.

Preferably, the inorganic compound F comprises, or even is, a compound chosen from the group consisting of zinc borate, basic zinc silicate and zinc stannate, magnesium hydroxide, zinc oxide, zinc sulphide, hydrotalcite, dihydrotalcite and bohmite, and mixtures thereof, more preferably zinc borate, zinc sulphide, zinc oxide, magnesiumhydroxide, hydrotalcite and dihydrotalcite, and mixtures thereof.

Most preferably, the inorganic compound F comprises, or even is, zinc borate.

Proportions of Flame Retardant Components

In a preferred embodiment of the invention, the flame retardant elastomeric composition comprises the components (B), (E) and (F) in a total amount of 10-50 wt. %, more preferably 15-40 wt. %, more preferably 18-35 wt. % and even 20-30 wt. %, relative to the total weight of the flame retardant elastomeric composition.

More preferably, the components (B), (E) and (F) are present in an amount of respectively, 20-90 wt. %, or even 50-80 wt. % of compound B, 10-80 wt. % or even 20-50 wt. % of compound E, and 0-20 wt. %, or even 2-10 wt. % of compound F, relative to the total weight of the compounds (B), (E) and (F).

In a more preferred embodiment of the insulated wire according to the invention, the metal salt (B) and the flame retardant component (E) are present in a weight ratio in the range of 9:1-2:9, preferably 5:1-1:1.

In another more preferred embodiment, the inorganic compound (F) is present in an amount of 0.01-5 wt. %, preferably 0.1-2 wt. %, relative to the total weight of the flame retardant elastomeric composition.

Additives (G)

The flame retardant elastomeric composition in the insulated wires according to the invention may suitably comprise one or more additives. The additive or additives that can be used in the flame retardant elastomeric composition may be any auxiliary additive, or combination of auxiliary additives, that is suitable for use in flame retardant elastomeric compositions.

Suitable additives include stabilizers, such as antioxidants, UV-absorbers and heat stabilizers, tougheners, impact modifiers, plasticizers, lubricants, emulsifiers, nucleating agents, fillers, pigments, optical brighteners, further flame retardants, and antistatic agents. Suitable fillers are, for example, calcium carbonate, silicates, talcum, and carbon black.

Preferably, the flame retardant elastomeric composition comprises one or more stabilizers. Suitable compounds that can be used as stabilizer include phosphites and phosphonites, esters and salts of long chain fatty acids and dicarboxamide compounds.

In a preferred embodiment of the invention the flame retardant elastomeric composition comprises one or more additives in a total amount of 0.01-20 wt. %, more preferably 0.1-10 wt. %, still more preferably 0.2-5 wt. %, or even 0.5-2 wt. % relative to the total weight of the flame retardant elastomeric composition.

More preferably, the flame retardant elastomeric composition comprises one or more compounds chosen from the group of phosphites and phosphonites, esters and salts of long chain fatty acids and dicarboxamide compounds, in a total amount of the one or more compounds of 0.01-3 wt. %, still more preferably 0.1-1.0 wt. %, relative to the total weight of the flame retardant elastomeric composition.

In a another preferred embodiment, the flame retardant elastomeric composition comprises a lubricant in the total amount of 0.1-10 wt. %, relative to the total weight of the flame retardant elastomeric composition and more preferably 0.2-5 wt. %, or even 0.5-2 wt. %. Suitable lubricants include hydrocarbon oils (eg. mineral, paraffin based oils) and/or silicone oils in addition to silicone compounds. Higher levels of lubricants, particularly hydrocarbon based lubricants lead to a decrease in the composition's flame retardancy. Suitable silicone compounds include silicone gums, silicone resins and/or silicone greases.

Suitable silicone compounds, include polysiloxane compounds such as polydimethylsiloxane. Preferably the lubricant is an ultra-high molecular weight (i.e solid 25° C.) polydimethylsiloxane such as products in the GENIOPLAST® resin range available from Wacker. The increased molecular weight compared to silicon oils reduces the prevalence of blooming of the silicone compounds, which have a detrimental effect on the surface's printing properties. Other suitable silicone compounds are also described in WO/2008/030768.

Special Embodiments

The combination of olefinic thermoplastic elastomers and/or styrenic block copolymers and flame retardants (B) and (E) provide a unique combination of flame retardant properties, mechanical and electrical properties all achieved while providing an insulated cable with enhanced consumer appeal as indicated by softness, surface feel and appearance, flexibility and density. In addition, the effectiveness of both the flame retardant component (B) and (E) to impart flame retardant properties and the styrenic block copolymer and/or olefinic thermoplastic elastomers component (A) to impart consumer properties, enables the flexibility of additional components to be added to improve the other functionalities such as processability, thermal resistance, mechanical strength, and surface appearance and feel.

A higher minimal total amount for components (B), and optionally (E) and/or (F) has the advantage that even better flame retardancy properties are obtained. A lower maximum total amount for components (B) optionally (E) and/or (F) has the advantage that the insulated wires have an improved softness and flexibility. Further, the relatively low levels of flame retardants required under the scope of the present invention enables a greater flexibility to tailor specific formulations to specific need use applications while maintaining the required flame retardant, mechanical, electrical, heat resistant and consumer appeal properties.

Unexpectedly, a formulation with a polymer component essentially consisting of styrenic block copolymers and polyolefins is able to maintain a required flame retardant performance, in combination with the necessary mechanical and consumer appeal properties.

For instance, as another embodiment of the present invention there is provided an insulated wire for use in electronic equipment, comprising an electrically conductive core and an insulating layer and/or a insulating jacket consisting of a flame retardant elastomeric composition surrounding the electrically conductive core, wherein the flame retardant elastomeric composition the formulation (%. wt expressed relative to the total weight of the flame retardant elastomeric composition) essentially consisting of:
- 20 wt % to 70 wt % styrenic block copolymer (A),
- 10 wt % to 40 wt % flame retardant component (B)
- 10 wt % to 60 wt % polypropylene (D); and optionally,
- 0 wt. % to 15 wt. % LLDPE (D),
- 5 wt % to 20 wt % flame retardant component (E),
- 0 wt. % to 5 wt. % of an inorganic compound chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof; (F)
- 0 wt. % to 10 wt % additives (G).

The combined level of the flame retardant components (B) and (E) is preferably between 20 wt % and 40 wt. % and more preferably between 25 wt % and 35 wt. % relative to the total weight of the flame retardant elastomeric composition.

Preferably, component (A) is in the range of 20 wt % to 60 wt. % and more preferably 25 wt. % to 50 wt. % relative to the total weight of the flame retardant elastomeric composition.

Preferably, Component (C) is in the range of 25 wt. % to 50 wt % relative to the total weight of the flame retardant elastomeric composition.

Alternatively, a relatively lower proportion of flame retardant component B may be used in combination with a styrenic block copolymer and thermoplastic elastomer blend as described in a further embodiment of the present invention, which provides an insulated wire for use in electronic equipment, comprising an electrically conductive core and an insulating layer and/or a insulating jacket consisting of a flame retardant elastomeric composition surrounding the electrically conductive core, wherein the flame retardant elastomeric composition the formulation (%. wt expressed relative to the total weight of the flame retardant flame retardant elastomeric composition) essentially consisting of:
- 10 wt % to 70 wt % styrenic block copolymer (A),
- 3 wt % to 35 wt % flame retardant components (B),
- 10 wt % to 65 wt % TPE-E (C) (eg. copolyetherester elastomer); and optionally,
- 0 wt. % to 15 wt. % LLDPE and/or PP (D),
- 1.5 wt % to 15 wt. % flame retardant component (E),
- 0 wt. % to 5 wt. % of an inorganic compound chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof; (F)
- 0 wt. % to 10 wt. % and preferably 0 wt. % to 5 wt. % additives (G).

Preferably, component (A) is in the range of 20 wt. % to 60 wt. % and more preferably 25 wt. % to 50 wt. % relative to the total weight of the flame retardant elastomeric composition.

Preferably, components (B) and (E) combined are in a range of 5 wt. % to 35 wt. % and more preferably 10 wt. % to 30 wt. % relative to the total weight of the flame retardant elastomeric composition.

Preferably, component (C) is in the range of 30 wt. % to 60 wt. % relative to the total weight of the flame retardant elastomeric composition.

This composition is able to comply with the UL 1581 VW-1 standard, especially when the proportion of flame retardants (B) and (E) are at the upper range limit (i.e 25 wt. % to 35 wt. % (B) and (E) combined), while lower flame retardant standards are maintainable at lower levels of component (B) and optionally (E) and/or (F). The relatively lower levels of the flame retardant system (B), (E) and (F) result in a relatively lighter (lower density) cable, compared to other non-halogen flame retardant systems, which has the mechanical and consumer appeal properties associated with the styrenic block copolymer and optionally the olefins.

In a variation of the above embodiment, the styrenic block copolymer may be substituted with TPO. In this modified embodiment, the combined level of flame retardant components (B) and (E) is preferably increased to between 20 wt % to 40 wt %.

Preferably, the insulation resistance in water is greater than 0.5, 0.75, 1.0, 1.5 or 2.0 GΩm.

Preferably, the elongation at break, determined according to ISO 527/1A, of the flame retardant elastomeric composition is at least 100%, 200%, 300%, 400%, 500% or even at least 600%.

Preferably, the E-modulus, determined according to ISO 527/1A, of the flame retardant elastomeric composition is less than 100 MPa, 90 MPa, 80 MPa, 70 MPa 60 MPa, 50 MPa or 40 MPa. Preferably, the composition has a minimum E-Modulus of at least 5 MPa and more preferably at least 10 MPa, to enable the cable to have sufficient rigidity to perform its function.

Preferably, the yield stress, determined according to ISO 527/1A, is less than 6 MPa, more preferably less than 5 MPa, more preferably less than 4.5 MPa and even more preferably less than 4 MPa. Preferably, the composition has a minimum yield stress of at greater 1.2 MPa and more preferably at greater 1.8 MPa, to enable the cable to have sufficient rigidity to perform its function.

Preferably the Shore A hardness, determined according to DIN 53505, is less than 90, 85, 80, 70, 60, 50 or 40.

Preferably the Shore D hardness, determined according to ISO R 868, is less than 45, 40, 36, 34, 33, 32 or 31.

Preferably, the roughness (Ra) of the cable surface is less than 11 Ra, more preferably less than 8 Ra, more preferably less than 6 Ra, more preferably less than 5 Ra, more preferably less than 4 Ra, even more preferably less than 3 Ra and most preferably less than 2 Ra.

The combination of elasticity (% elongation at break), softness (low Shore A hardness), flexibility (low E modulus and yield stress) and/or smoothness (low roughness Ra) are mechanical properties of particular importance to the consumer appeal of the resultant insulated wire or product derived therefrom.

The invention in particular relates to an insulated wire wherein the insulated wire is a bipolar or tripolar wire consisting of two or three electrically conductive cores, two or three insulating layers each surrounding one of the electrically conductive cores, and optionally a jacket layer surrounding the electrically conductive cores and the insulating layers, wherein the insulating layers and/or the jacket layer consist of the flame retardant elastomeric composition comprising components (A) and (B) or any preferred embodiment thereof as described above.

The invention also relates to a connection cable comprising (i) a piece of an insulated wire according to the invention or any preferred embodiment thereof and (ii) one or two connection elements, for connecting the cable to electrical and/or electronic equipment and/or to a power supply unit, fixed to the piece of insulated wire and optionally (iii) a electrical or electronic part.

Suitably, the connection cable is a mobile phone charger cable or computer accessory connection cable.

The invention further relates to the use of the inventive insulated wires and connection cables made thereof in or connected to electronic equipment and to electronic equipment comprising insulated wires according to the invention, or any preferred embodiment thereof.

The invention also relates to a flame retardant elastomeric composition. The flame retardant elastomeric composition according to the invention corresponds with the flame retardant elastomeric composition in the insulated wire according to the invention described here above, and any of the preferred embodiments thereof. The advantage of the flame retardant elastomeric composition according to the invention resides in the combined effects on flame retardancy and consumer appeal properties, in addition to other effects when the flame retardant elastomeric composition is applied in electrical cables as described above.

The flame retardant elastomeric composition can be made by compounding methods used in the art for making flame retardant thermoplastic compositions in general and elastomeric thermoplastic compositions in particular. Suitable methods include methods involving melt mixing, i.e. methods wherein the styrenic block copolymer (A) is transformed into a melt and the component (B), and other optional components are added, simultaneously, consecutively or partly simultaneously and partly consecutively to the styrenic block copolymer and/or olefinic thermoplastic elastomer (A) prior, during or after the transformation into the melt and the polymer melt and the polymer melt and other components and additives are mixed to form a homogenous mixture.

Suitably, this melt mixing is performed in an extruder and the homogenous mixture after being formed by said melt mixing is discharged from the extruder after which the composition is cooled and optionally granulated.

It is also possible to add the flame retardant components and the additives in the form of a master batch. It is also possible, in particular with solid additives, to add the additive or additives after cooling and optional granulation, whereby the additive or additives is applied on the granule surface.

The cooled and optionally granulated composition can be used for making the insulated wires, for example by extrusion coating of one or more metal wires which than form the electrically conductive core of the resulting insulated wires.

The invention is further illustrated with the following Examples and Comparative Experiments.

EXAMPLES

Materials
SEBS-1: SEBS having a MFI of 7 g/10 min (260° C./5 kg), containing in the range of 37-44 wt % styrene and available from Kraton under the trade name ARP6936.
SEBS-2: SEBS having a MFI of 18 g/10 min (230° C./2.16 kg), containing 20 wt % styrene and available from Kraton under the trade name G1643.
SEBS-3: SEBS having a MFI of 4 g/10 min (230° C./2.16 kg), containing 13 wt % styrene and available from Kraton under the trade name MD6945.
SEBS-4: SEBS having a MFI of 40 g/10 min (230° C./5 kg), containing 13 wt % styrene and 1 wt % MA and available from Kraton under the trade name FG1924.
TPE-E-1: Polyesterester comprising hard segments consisting of polybutyleneterephthalate segments and soft segments consisting of EO/PO polyether blockcopolymer with a shore-D hardness of 38.
TPE-E-2: Polyesterester comprising hard segments consisting of polybutyleneterephthalate segments and soft segments consisting of polylactone segments linked with urethane groups with a shore-D hardness of 55.
TPU: A thermoplastic polyether polyurethane with a nominal Shore 95 A hardness manufactured by Bayer and available under the trade name of Desmopan 9395 A.
TPO-1: A vulcanized EPDM rubber/thermoplastic blend with a nominal Shore 94 A hardness manufactured by DSM and available under the trade name of Sarlink 3190.
TPO-2: A vulcanized EPDM rubber/thermoplastic blend with a nominal Shore 65 A hardness manufactured by DSM and available under the trade name of Sarlink 3160.
PP: Polypropylene homopolymer having a MFI of 24 g/10 min (230° C./2.16 kg) and manufactured by Sabic and available under the trade name of PP515A.
LLDPE: A linear low density polyethylene, produced in a solution polymerisation process using a metallocene catalyst, containing about 20% octane, having a MFI of 10 g/10 min (190° C./2.16 kg) and available from Dexplastomers, Heerlen, the Netherlands under the trade name of Exact™ 0210.
Mecy: Melamine cyanurate (MC50; particle size distribution with a d50 of about 4.2 µm and a d99 of about 45 µm)
Compound B: DEPAL: Aluminium diethylphosphinate; Clariant, Germany.
Compound C: Melapur™ 200: Melamine polyphosphate; Ciba Geigy, Switzerland.
Compound D: Zinc Borate ($2\,ZnO_3B_2O_3.3.5\,H_2O$), Flamebrake™ 500, Borax, USA
Add-1: Blend of auxiliary stabilizer package.
Add-2 Ethylene/methyl acrylate/glycidyl methacrylate terpolymer having an MFI of 6 g/10 min (190° C./2.16 kg) containing 25 wt % acrylate and 8 wt % glycidyl methacrylate sold by Atofina under the brand LOTADER™ AX8900
Add-3 Silicon gum comprising ultrahigh-molecular-weight polydimethylsiloxane in pellet form available from Wacker under the trade name Genioplast™ Pellet S.
Add-4 Silicone oil comprising polydimethylsiloxane having a viscosity of 350 centistokes and available from Dow Corning under the trade name 200™ Fluid 350 cs.
Add-5 Mineral oil having a kinematic viscosity at 40° C. of 68-74 mm²/s and available from Exxon under the trade name of Primol™ 352.
Add-6 Flow improver having a Shore D hardness of 45D available from Kraton under the trade name of Kraton™ MD6699.

Compounding
For the preparations of moulding compositions, ingredients were compounded in ratios as indicated in Tables 1 to 3. The moulding compositions were prepared by melt-blending the SEBS, TPE-E, TPU, TPO, PP and LLDPE with the flame retardant components and stabilizer package on a ZSK 25/33 (Table 1 compositions) or a ZSK 30/34D (Tables 2 & 3 compositions) twin-screw extruder with screw speed 400 rpm and 300 rpm respectively, throughput of 25 kg/hr, and melt temperature regulated at 270° C., extruding the melt from the extruder through a die, and cooling and granulating the melt. The granules obtained by compounding in the extruder were dried for 24 hours at 90° C., prior to further use.

Moulding of Test Samples and Insulated Cables
Test samples for testing the mechanical properties and the flame retardancy properties according to UL-94-V (1.5 mm thickness) were prepared on an injection-moulding machine of type Engel 80 A. For the injection moulding set temperatures of 235-245° C. were used. The mould temperature was 90° C. Cycle times for the test specimens were about 50 sec.

Insulated cables for testing the flame retardancy properties according to UL 1581 VW-1 were prepared on an industrial production line under comparable operating conditions at a speed of between 50 to 100 m/min. The cables thus produced included:

Cable 1: bipolar cables, consisting of two copper wires as the conductive cores and a single insulating layer consisting of one of the experimental compositions described below. The bipolar cables were oval shaped while having an oval shaped cross-section with a dimension of 1.4×2.8 mm. This type of cable is used for mobile phone charger cable type applications.

Cable 2: Insulated 18AWG cable. This cable is used in NC power cable type applications.

Cable 3: Insulated jacketed SVE cable containing 3 cores of Insulated 18AWG cable. This cable is used for A/C power cable type applications.

Cable 4: Insulated jacketed having an insulation jacket thickness of 0.2 mm containing a multi-core of cables. The cables were circular in shaped cross-section with a diameter of 2.9 mm. This cable is typically used for USB type applications.

The flame retardant and mechanical properties of cable 1 are presented in table 1.

The flame retardant and mechanical properties of cables 2, 3 and 4 are presented in table 4 and 5.

Test Methods

Mechanical properties:

Tensile tests (E-modulus, Stress at yield and elongation at break) were performed according to ISO 527/1A using dry-as-moulded samples. Dimensions of tensile test specimens: thickness 4 mm.

Shore D hardness according to ISO R 868

Shore A hardness according to DIN 53505

Roughness (arithmetic average deviation, Ra) was determined by a method consistent with ISO 4287 using a Wyko NT1100 optical profiler system, commercially available from Veeco Metology Group, USA.

Deformation at 150° C.: cable 2 (18AWG) and cable 3 (SVE) was performed in accordance to UL1581 and UL62.

Deformation at 150° C. plate: of compositions used in cables were also performed on tensile tests bars to enable suitable cable composition to be more efficiently screened.

Sample Preparation:

The materials are supplied as injection moulded tensile bars ISO 527-2: 1993 (E) type 1BA. The end of the tensile bar is cut off to obtain a square sample of 10 mm×10 mm. The thickness of the sample (T1) is measured by means of a length gauge.

Test Set-Up:

Length Gauge: Heidenhain MT30E

Compression Machine: Zwick Z1474

Load-cell: HBM type U2A $F_{max}$=2 kN.

Displacement measurement: Machine displacement

Compression Load 1 MPa

Retardation load: 0.1 N

Test-speed: 5 mm/min

Test conditions: 150° C. ±1.0° C.

The sample is placed between the flat surface of a cylindrical compression tool with a surface diameter of 5 mm, and a smooth surface mounted plane parallel to each other and kept at a temperature of 150° C. for 60 minutes. After this preliminary heating, the compression tool moves with a constant speed (5 mm/min) until the defined compression load of 1 MPa is reached. The compression load is maintained at 1 MPa for a total of 60 minutes before the compression tool, moving with a constant speed (5 mm/min), releases the compression load to a retardation load of 0.1N. Ten seconds after the retardation load is reached, the thickness of the sample (T2) is determined by measuring the distance between the compression tool and the smooth surface through the machine's displacement channel. The test equipment is available from the Material Science Centre of DSM, Geleen, the Netherlands.

The percent deformation is to be calculated for the specimen from the following formula:

$$\text{Deformation in percentage} = \frac{(T1 - T2) \times 100}{T1}$$

Where,

T1=The thickness of the sample measured at 23° C. expressed in millimeters; and

T2=The thickness of the sample measured at 150° C. after 10 s retardation time expressed in millimeters Flame retardancy: Sample preparation and testing was performed according to UL94-V (at a distance of 1.5 mm) and UL1581 VW-1, respectively.

Compounds with the compositions of Examples 1 to 24 (E1-E24) according to the invention and Comparative Experiments 1-10 (C1 to C10) were prepared and tested as described above. The compositions and test results are presented in Tables 1-5.

Results

The results from Table 1 indicate that the combination of polymer and the flame retardant system as defined in the present invention produces either improved flexibility (i.e. in a desired application range) as indicated by the E modulus values, while in most instances having improved UL1581 VW-1 flame retardancy performance. Tables 2 to 5 further demonstrate that the improvement in mechanical properties of the compositions of the present invention, extends to a combination of softness, surface and/or high temperature performance properties.

The improvement in mechanical properties also is dependent upon the further additives and/or polymer components added to the elastomeric polymers selected from the group consisting of styrenic block copolymers, olefinic thermoplastic elastomers and combinations thereof.

The addition of polyetherester (eg. TPE) contributes to excellent heat deformation properties as indicated by the heat deformation results respectively (Table 4 & 5). The combination of SEBS and TPE produces a particularly advantageous combination of properties which balance flexibility, softness, flame retardancy and surface properties. The addition of polyether polyurethane (TPU) contributes to excellent tensile strength, elongation retention and surface properties. It is noted that the softness and flexibility of the TPU examples (E12 and E13) may be readily adjusted through the use of a TPU with a lower hardness, while maintaining a good level of flame retardancy. The addition of TPO results in excellent deformation results at 150° C. It is further noted that the use of a softer TPO and the addition of further lubricants and heat stabilizes is expected to further improve the mechanical and functional properties of TPO based compositions under the scope of the present invention.

Importantly, the combination of component (A) polymers and component (B) flame retardants results in a heat stable composition with sufficiently high overall flame retardancy that there is flexibility to add further components to the composition, thereby enabling the optimization of mechanical properties for a specific application. For example, polymer (e.g. PP) and additives (e.g. mineral oil) which contribute towards poor flame retardancy, and thus are not traditionally associated with flame retardant compositions, may be added to improve surface, softness and/or flexibility of the composition.

Surprisingly, compositions containing no or very little SEBS (i.e. 5 wt. %) exhibit a relatively rougher surface compared to compositions containing an intermediate amount, independent of the presence of lubricating agents.

TABLE 1

Compositions (in parts by weight) and test results for Examples E1-E2 and Comparative Experiments C1-C7

|  | E1 | E2 | C1 | C2 | C3 | C4 | C5 | C6 | C7 |
|---|---|---|---|---|---|---|---|---|---|
| SEBS-3 | 22.5 | 7.5 | 0 | 0 | 0 | 0 | 0 | 0 | 47 |
| SEBS-4 | 7.5 | 2.5 |  |  |  |  |  |  | 20 |
| TPE-E1 | 37 | 62 | 72 | 84.25 | 68.5 | 89.5 | 69.5 | 0 | 0 |
| TPE-E2 |  |  |  |  |  |  |  | 74.5 |  |
| Mecy |  |  |  |  |  | 10 | 30 | 25 |  |
| B | 19 | 16 | 16 | 10 | 20 |  |  |  | 19 |
| C | 9 | 8 | 8 | 5 | 10 |  |  |  | 9 |
| D | 2 | 1 | 1 | 0.75 | 1.5 |  |  |  | 2 |
| Add-1 | 3 | 3 | 3 | 0.5 | 0.5 | 0.5 | 0.5 | 0.5 | 3 |
| UL1581 VW-1 (Cable 1) | Pass | Pass | Pass | Pass | Pass | Fail | Fail | Fail | Pass |
| UL94-V-rating (1.5 mm) | V2 | V2 | V2 | Fail | 50% V0 50% V2 | 100% V2 | 60% V0 40% V2 | 100% V0 | V2 |
| E Modulus (MPa) | 55 | 45 | 100 | 80 | 125 | 85 | 175 | 300 | 4 |

TABLE 2

Compositions (in parts by weight) for Examples E3-E14

|  | E3 | E4 | E5 | E6 | E7 | E8 | E9 | E10 | E11 | E12 | E13 | E14 |
|---|---|---|---|---|---|---|---|---|---|---|---|---|
| SEBS-1 |  |  | 25 | 25 |  | 30 |  |  | 30 | 30 | 25 |  |
| SEBS-2 | 10 | 17 |  |  | 30 |  | 25 | 30 |  |  |  |  |
| SEBS-3 |  |  |  |  |  |  |  |  |  |  |  |  |
| SEBS-4 |  |  |  |  |  |  |  |  |  |  |  |  |
| TPE-E1 | 62 | 44 | 38.5 | 38.5 | 43 | 39 | 47 | 42.5 | 38.5 |  |  | 36 |
| TPU |  |  |  |  |  |  |  |  |  | 38.5 | 38.5 |  |
| TPO-1 |  |  |  |  |  |  |  |  |  |  |  | 27.5 |
| PP |  | 6 | 5 |  |  |  |  |  |  |  |  |  |
| LLDPE |  | 11 |  | 5 |  |  |  |  |  |  | 5 |  |
| B | 16 | 12 | 19 | 19 | 16 | 19 | 16 | 17 | 19 | 19 | 19 | 19 |
| C | 8 | 6 | 9.5 | 9.5 | 8 | 9.5 | 8 | 8 | 9.5 | 9.5 | 9.5 | 9.5 |
| D | 1.25 | 1 | 1.5 | 1.5 | 1.25 | 1.5 | 1.25 |  | 1.5 | 1.5 | 1.5 | 1.5 |
| Add-1 | 2.75 | 3 | 1.5 | 1.5 | 1.75 | 1 | 2.75 | 2.5 | 1.5 | 1.5 | 1.5 | 1.5 |
| Add-2 |  |  |  |  |  |  |  |  |  |  |  | 5 |
| Add-3 |  |  |  |  |  |  |  |  |  |  |  |  |
| Add-4 |  |  |  |  |  |  |  |  |  |  |  |  |
| Add-5 |  |  |  |  |  |  |  |  |  |  |  |  |
| Add-6 |  |  |  |  |  |  |  |  |  |  |  |  |

TABLE 3

Compositions (in parts by weight) for Examples E15-E24 and Comparative Experiments C8-C10

|  | E15 | E16 | E17 | E18 | E19 | E20 | E21 | E22 | E23 | E24 | C8 | C9 | C10 |
|---|---|---|---|---|---|---|---|---|---|---|---|---|---|
| SEBS-1 | 30 | 30 | 30 |  | 27 | 30 | 30 |  |  | 22.5 |  |  |  |
| SEBS-2 |  |  |  | 30 |  |  |  |  |  |  |  |  |  |
| SEBS-3 |  |  |  |  |  |  |  |  | 22.5 |  |  |  | 50 |
| SEBS-4 |  |  |  |  |  |  |  | 5 | 7.5 |  |  |  | 17 |
| TPE-E1 | 41.5 | 41.5 | 41.5 | 44.5 | 39 | 38 | 38 | 65.5 | 47 | 41.5 | 72 |  |  |
| TPU |  |  |  |  |  |  |  |  |  |  |  |  |  |
| TPO-1 |  |  |  |  |  |  |  |  |  |  |  | 68.5 |  |
| PP |  |  |  |  |  |  |  |  |  |  |  |  |  |
| LLDPE |  |  |  |  |  |  |  |  |  |  |  |  |  |
| B | 17.5 | 22.5 | 18.5 | 25 | 19 | 19 | 19 | 17 | 13 | 17 | 16 | 19 | 19 |
| C | 9 |  |  |  | 9.5 | 9.5 | 9.5 | 9 | 6 | 9 | 8 | 9.5 | 9.5 |
| D | 1.5 | 5 | 9 |  | 1.5 | 1.5 | 1.5 | 1.5 | 1 | 1.5 | 1.25 | 1.5 | 1.5 |

TABLE 3-continued

Compositions (in parts by weight) for Examples E15-E24 and Comparative Experiments C8-C10

|       | E15 | E16 | E17 | E18 | E19 | E20 | E21 | E22 | E23 | E24 | C8  | C9  | C10 |
|-------|-----|-----|-----|-----|-----|-----|-----|-----|-----|-----|-----|-----|-----|
| Add-1 | 0.5 | 1   | 1   | 0.5 | 1   | 1   | 1   | 2   | 3   | 1   | 2.5 | 1.5 | 3   |
| Add-2 |     |     |     |     |     |     |     |     |     |     |     |     |     |
| Add-3 |     |     |     |     | 1   |     |     |     |     |     |     |     |     |
| Add-4 |     |     |     |     |     | 1   |     |     |     |     |     |     |     |
| Add-5 |     |     |     |     | 3   |     |     |     |     |     |     |     |     |
| Add-6 |     |     |     |     |     |     |     |     |     | 7.5 |     |     |     |

TABLE 4

Composition test results for Examples E3-E14

|                                         | E3    | E4     | E5    | E6    | E7    | E8    | E9    | E10   | E11   | E12   | E13   | E14   |
|-----------------------------------------|-------|--------|-------|-------|-------|-------|-------|-------|-------|-------|-------|-------|
| Tensile Strength (MPa)                  | 8.3   | 8.3    | 8.3   | 7     | 8.1   | 8.6   | 9.8   | 7.6   | 7.9   | 12.9  | 11.8  | 7     |
| % Elongation                            | 557   | 515    | 392   | 409   | 652   | 453   | 499   | 609   | 420   | 318   | 290   | 80    |
| Elong. Retent. 121° C./136° C., 168 hr  | 79/—  | 100/31 | 95/—  | 92/—  | 97/89 | 96/89 | 85/67 | 76/69 | 100/— | 96/—  | 100/— | 100/— |
| E-Modulus (MPa)                         | 41    | 45     |       |       | 42    | 68    | 49    | 35    |       |       |       |       |
| Hardness Shore A                        | 89    | 85     | 90    | 89    | 81    | 85    | 88    | 82    | 88    | 90    | 91    | 92    |
| Hardness Shore D                        | 32    | 28     | 34    | 34    | 25    | 30    | 33    | 26    | 32    | 42    | 40    | 33    |
| Yield Stress (MPa)                      | 5.5   | 4.5    | 4     | 3.5   | 3.5   | 3.5   | 4.5   | 3.3   | 3.5   | 5.5   | 5.5   | 6     |
| Roughness (Ra)                          | 5     | 2      | 3     | 5     | 5     | 5     | 3     |       | 4     | 4     | 3     | 4     |
| % Deform @150° C.18AWG                  | 23    |        | 20    | 25    |       | 22    |       |       |       |       |       |       |
| % Deform@150° C. SVE                    |       | 13     |       |       | 17    |       | 12    |       |       |       |       |       |
| % Deform. @150° C. plate                |       |        | 19    | 31    |       |       |       |       | 22    | 68    | 78    | 2     |
| UL94 rating (1.5 mm)                    | V2    | NC     | V2    | V2    | V2    | V2    | V2    | V2    | V2    | V2    | V2    |       |
| UL1581 VW-1 (Cable 2)                   | Pass  | Fail   | Pass  | Pass  | Fail  | Pass  | Fail  | Fail  | Pass  | Pass  | Pass  | Fail  |
| UL1581VW-1 (Cable 3)                    | Pass  | Fail   | Pass  | Pass  | Fail  | Pass  | Pass  | Fail  | Pass  | Pass  | Pass  | Fail  |
| UL1581VW-1 (Cable 4)                    | Pass  | Pass   | Pass  | Pass  | Pass  | Pass  | Pass  | Pass  | Pass  | Pass  | Pass  | Pass  |

TABLE 5

Composition test results for Examples E15-E24 and Comparative Experiments C8-C10

|                                         | E15   | E16   | E17   | E18   | E19   | E20   | E21   | E22   | E23   | E24    | C8    | C9    | C10   |
|-----------------------------------------|-------|-------|-------|-------|-------|-------|-------|-------|-------|--------|-------|-------|-------|
| Tensile Strength (MPa)                  | 9     | 8.5   | 8.6   | 5.8   | 8.9   | 8.2   | 8.1   | 9.4   | 6.6   | 9.8    | 10.3  | 8.4   | 5.3   |
| % Elongation                            | 470   | 501   | 410   | 573   | 527   | 418   | 430   | 582   | 572   | 497    | 570   | 233   | 807   |
| Elong. Retent. 121° C./136° C., 168 hr  | 97/—  | —/74  | 90/—  | —/65  | 97/—  | 100/— | 98/—  | 86/69 | 100/— | 100/76 | 72/—  | 47/—  | 98/—  |
| E-Modulus (MPa)                         |       |       |       |       |       |       |       | 80    | 30    |        | 100   |       | 4     |
| Hardness Shore A                        |       |       |       | 86    | 88    | 87    | 87    | 80    |       | 88     | 92    | 91    | 53    |
| Hardness Shore D                        |       |       |       | 30    | 31    | 30    | 31    | 24    |       |        | 36    | 34    |       |
| Yield Stress (MPa)                      | 3.8   | 3.8   | 3.6   | 2.8   | 3.5   | 3.4   | 3.2   | 6     | 4     | 3.8    | 6.5   | 6.5   | 1     |
| Roughness (Ra)                          | 3     |       |       |       | 4     | 3     | 5     | 10    |       | 2      | 6     | 10    | 12    |
| % Deform. @150° C. 18AWG                | 22    |       |       |       | 20    | 22    | 23    | 11    | 30    |        | 5     |       |       |
| % Deform. @150° C. SVE                  |       |       |       |       |       |       |       |       |       | 15     |       |       |       |
| % Deform. @150° C. plate                |       |       |       |       |       |       |       | 1     |       |        | 2     |       | 98    |
| UL94 rating (1.5 mm)                    | V2    | V2    | V2    | V2    | V2    | V2    | V2    | V2    | V2    | V2     | V2    |       | V2    |
| UL1581VW-1 (Cable 2)                    | Pass  | Fail  | Pass  | Fail  | Pass  | Pass  | Pass  | Pass  | Fail  | Pass   | Pass  | Fail  | Pass  |
| UL1581VW-1 (Cable 3)                    | Pass  | Pass  | Pass  | Fail  | Pass  | Pass  | Pass  | Pass  | Fail  | Pass   | Pass  | Fail  | Pass  |
| UL1581VW-1 (Cable 4)                    | Pass  | Pass  | Pass  | Pass  | Pass  | Pass  | Pass  | Pass  | Pass  | Pass   | Pass  | Pass  | Pass  |

The invention claimed is:

1. An insulated wire for use in electronic equipment, comprising an electrical conductive core and an insulating layer and/or an insulating jacket consisting of a flame retardant polymer composition surrounding the electrically conductive core, wherein the flame retardant elastomeric composition (expressed as % wt relative to the weight of the total flame retardant elastomeric composition) consists of:
   (A) 10 wt % to 70 wt % styrenic block copolymer,
   (B) 3 wt % to 35 wt % of a metal salt of a phosphinic acid of the formula $[R^1R^2P(O)O]^-_m M^{m+}$ (formula I) and/or a diphosphinic acid of the formula $[O(O)PR^1—R^3—PR^2(O)O]^{2-}_n M_x^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups,
   $R^3$ is chosen from the group consisting of linear, branched and cyclic C1-C10 aliphatic groups and C6-C10 aromatic and aliphatic-aromatic groups,
   M is a metal chosen from the group consisting of Mg, Ca, Al, Sb, Sn, Ge, Ti, Zn, Fe, Zr, Ce, Bi, Sr, Mn, Li, Na, and K, and
   m, n and x are equal or different integers in the range of 1-4, and
   (C) 10 wt % to 65 wt % copolyetherester elastomer; and optionally, (D) 0 wt. % to 15 wt. % PP and/or LLDPE, (E) 0 wt. % to 15 wt % of a flame retardant component consisting of a nitrogen containing flame retardant synergist and/or a phosphor/nitrogen containing flame retardant, (F) 0 wt. % to 5 wt. % of an inorganic compound chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof; and (G) 0 wt % to 10 wt % of additives.

2. The insulated wire according to claim 1, wherein the metal salt (B) and the flame retardant component (E) are present in a weight ratio in the range of 9:1-2:9.

3. The insulated wire according to claim 1, wherein the insulated wire is a bipolar or tripolar wire consisting of two or three electrically conductive cores, two or three insulating layers each surrounding one of the electrically conductive cores, and optionally a jacket layer surrounding the electrically conductive cores and the insulating layers, wherein the insulating layers and/or the jacket layer consist of the flame retardant elastomeric composition.

4. A connection cable comprising (i) a piece of an insulated wire according to claim 1, and (ii) one or two connection elements, for connecting the cable to electrical and/or electronic equipment and/or to a power supply unit, fixed to the piece of insulated wire and optionally (iii) a electrical or electronic part.

5. The connection of claim 4, wherein the connection cable is a mobile phone charger cable or computer accessory connection cable.

6. An electronic equipment comprising a connection cable according to claim 4.

7. An electronic equipment comprising insulated wires according to claim 1.

8. An insulated wire according to claim 1 which complies with standard UL 1581 VW-1 standard.

9. A connection cable comprising an insulated wire according to claim 1, wherein the connection cable complies with UL 1581 VW-1 standard.

* * * * *